(12) United States Patent
Lee et al.

(10) Patent No.: US 12,414,013 B2
(45) Date of Patent: Sep. 9, 2025

(54) APPARATUS AND METHOD FOR RESOURCE ALLOCATION IN WIRELESS COMMUNICATION SYSTEM

(71) Applicant: Samsung Electronics Co., Ltd., Suwon-si (KR)

(72) Inventors: Seungjoo Lee, Suwon-si (KR);
Seungchul Choi, Suwon-si (KR);
Youngsan Kim, Suwon-si (KR);
Youngjae You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 17/901,730

(22) Filed: Sep. 1, 2022

(65) Prior Publication Data

US 2022/0417795 A1    Dec. 29, 2022

Related U.S. Application Data

(63) Continuation of application No. PCT/KR2022/003707, filed on Mar. 17, 2022.

(30) Foreign Application Priority Data

Mar. 17, 2021    (KR) .................. 10-2021-0034788

(51) Int. Cl.
*H04W 28/20*    (2009.01)
*H04W 8/24*    (2009.01)

(52) U.S. Cl.
CPC ............. *H04W 28/20* (2013.01); *H04W 8/24* (2013.01)

(58) Field of Classification Search
CPC ....... H04W 28/20; H04W 8/24; H04W 60/04; H04W 72/0453; H04W 72/21;
(Continued)

(56) References Cited

U.S. PATENT DOCUMENTS 10,142,991 B2    11/2018    Van Phan et al.
10,735,932 B2    8/2020    Ge et al.
(Continued)

FOREIGN PATENT DOCUMENTS

CN         110710295       1/2021
KR    10-2009-0084602       8/2009
(Continued)

OTHER PUBLICATIONS

International Search Report for PCT/KR2022/003707, dated Jun. 30, 2022, 5 pages.
(Continued)

*Primary Examiner* — Charles C Jiang
*Assistant Examiner* — Margaret Marie Anderson
(74) *Attorney, Agent, or Firm* — Nixon & Vanderhye P.C.

(57) ABSTRACT

An electronic device of the disclosure may comprise: a communication circuit and at least one processor, wherein the at least one processor is configured to: control the communication circuit to transmit first capability information of the electronic device to a base station, identify, based on data throughput, whether an additional resource is needed, and based on identifying that the additional resource is needed, control the communication circuit to transmit an additional resource request message to the base station, wherein the first capability information comprises a request related to a basic resource, and the basic resource comprises at least one of a number of component carriers (CCs), a number of multiple-input multiple-output (MIMO) layers, or a bandwidth in an operating band.

12 Claims, 8 Drawing Sheets

(58) Field of Classification Search
CPC ..... H04W 72/52; H04W 72/51; H04W 88/02; H04B 7/0413; H04L 5/001; H04L 5/0064
See application file for complete search history.

(56) References Cited

U.S. PATENT DOCUMENTS

| | | | |
|---|---|---|---|
| 11,490,363 B2 | 11/2022 | Wang et al. | |
| 2011/0263212 A1* | 10/2011 | Yeh | H04W 28/22 455/73 |
| 2014/0022125 A1 | 1/2014 | Zhu et al. | |
| 2014/0153544 A1* | 6/2014 | Lu | H04L 12/1407 370/331 |
| 2016/0119105 A1* | 4/2016 | Jiang | H04L 1/1812 370/329 |
| 2018/0098221 A1* | 4/2018 | Zimmerman | H04W 72/52 |
| 2018/0199185 A1* | 7/2018 | Tenny | H04W 8/22 |
| 2018/0302127 A1 | 10/2018 | Kahrizi et al. | |
| 2019/0058555 A1 | 2/2019 | Yoo et al. | |
| 2019/0379427 A1 | 12/2019 | Geekie et al. | |
| 2020/0112921 A1 | 4/2020 | Han et al. | |
| 2020/0120729 A1 | 4/2020 | Tang | |
| 2020/0145986 A1 | 5/2020 | Park et al. | |
| 2020/0245450 A1* | 7/2020 | Baek | H05K 1/115 |
| 2020/0267648 A1 | 8/2020 | Kim et al. | |
| 2020/0344697 A1* | 10/2020 | Aoki | H04B 7/06 |
| 2021/0227623 A1 | 7/2021 | Park et al. | |

FOREIGN PATENT DOCUMENTS

| | | |
|---|---|---|
| KR | 10-2018-0049782 | 5/2018 |
| KR | 10-2019-0134063 | 12/2019 |
| KR | 10-2020-0039295 | 4/2020 |
| KR | 10-2020-0050852 | 5/2020 |
| KR | 10-2437642 | 8/2022 |

OTHER PUBLICATIONS

Written Opinion of the ISA for PCT/KR2022/003707, dated Jun. 30, 2022, 4 pages.

* cited by examiner

APPARATUS AND METHOD FOR RESOURCE ALLOCATION IN WIRELESS COMMUNICATION SYSTEM

CROSS-REFERENCE TO RELATED APPLICATIONS

This application is a continuation of International Application No. PCT/KR2022/003707 designating the United States, filed on Mar. 17, 2022, in the Korean Intellectual Property Receiving Office and claiming priority to Korean Patent Application No. 10-2021-0034788, filed on Mar. 17, 2021, in the Korean Intellectual Property Office, the disclosures of which are incorporated by reference herein in their entireties.

BACKGROUND

Field

The disclosure relates generally to a wireless communication system and, for example, to an apparatus and a method for resource allocation in a wireless communication system.

Description of Related Art

According to an increase in communication speed, terminal power consumption is increased, and thus overtemperature has become a problem. In order to reduce power and heating, terminals control a particular function, based on an internal thermistor or a power consumption amount.

SUMMARY

Embodiments of the disclosure provide an apparatus and a method for controlling resource allocation by a terminal in a wireless communication system.

Embodiments of the disclosure provide an apparatus and a method for being allocated a minimum resource by a terminal when the terminal accesses a network in a wireless communication system.

Embodiments of the disclosure provide an apparatus and a method for being allocated an additional resource by a terminal, based on data throughput in a wireless communication system.

Embodiments of the disclosure provide an apparatus and a method for identifying a minimum number of antenna elements by a terminal, based on received signal strength in a wireless communication system.

An electronic device in a wireless communication system according to an example embodiment of the disclosure may include: a communication circuit and at least one processor operatively connected to the communication circuit, wherein the at least one processor is configured to: control the communication circuit to transmit first capability information of the electronic device to a base station; identify, based on data throughput, whether an additional resource is needed; and based on identifying that the additional resource is needed, control the communication circuit to transmit an additional resource request message to the base station, the first capability information corresponding to a request related to a basic resource, and the basic resource being related to at least one of the number of component carriers (CCs), the number of multiple-input multiple-output (MIMO) layers, or a bandwidth in an operating band.

An electronic device in a wireless communication system according to an example embodiment of the disclosure may include: a communication circuit and at least one processor operatively connected to the communication circuit, wherein the at least one processor is configured to: control the communication circuit to transmit first capability information of the electronic device to a base station; control the communication circuit to transmit an overheating assistance message to the base station; identify, based on data throughput, whether an additional resource is needed; and based on identifying that the additional resource is needed, control the communication circuit to transmit an additional resource request message to the base station, the overheating assistance message including information on a basic resource, and the information on the basic resource including at least one of information on the number of component carriers (CCs), the number of multiple-input multiple-output (MIMO) layers, or a bandwidth.

A method performed by an electronic device in a wireless communication system according to an example embodiment of the disclosure may include: transmitting first capability information of the electronic device to a base station; identifying, based on data throughput, whether an additional resource is needed; and based on identifying that the additional resource is needed, transmitting an additional resource request message to the base station, wherein the first capability information corresponds to a request related to a basic resource, and the basic resource is related to at least one of the number of component carriers (CCs), the number of multiple-input multiple output (MIMO) layers, or a bandwidth in an operating band.

A method performed by an electronic device in a wireless communication system according to an example embodiment of the disclosure may include: transmitting first capability information of the electronic device to a base station; transmitting an overheating assistance message to the base station; identifying, based on data throughput, whether an additional resource is needed; and based on identifying that the additional resource is needed, transmitting an additional resource request message to the base station, wherein the overheating assistance message includes information on a basic resource, and the information on the basic resource includes at least one of information on the number of component carriers (CCs), the number of multiple-input multiple-output (MIMO) layers, or a bandwidth.

According to an apparatus and a method of various example embodiments of the disclosure, the overheating of a device may be prevented or reduced by controlling resource allocation.

In addition, according to an apparatus and a method of various example embodiments of the disclosure, the power consumption of a device may be optimized by controlling resource allocation.

In addition, according to an apparatus and a method of various example embodiments of the disclosure, the time for maintenance of 5th generation (5G) communication connection may be maximized or increased.

In addition, according to an apparatus and a method of various example embodiments of the disclosure, long term evolution (LTE) fallback may be prevented or reduced.

In addition, according to an apparatus and a method of various example embodiments of the disclosure, the overheating of a device may be prevented or reduced in a 5G standalone (SA) mode.

In addition, according to an apparatus and a method of various example embodiments of the disclosure, resource allocation may be efficiently performed.

In addition, according to an apparatus and a method of various example embodiments of the disclosure, a terminal may be managed to operate at an operation securing temperature or lower.

Effects which may be acquired by the disclosure are not limited to the effects described above, and other effects that have not been mentioned may be clearly understood by those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms used in the disclosure are merely for the purpose of describing various embodiments and are not intended to limit the scope of the embodiments. A singular expression may include a plural expression unless they are definitely different in a context. All terms used herein, including technical and scientific terms, may have the same meaning as those commonly understood by a person skilled in the art to which the disclosure pertains. Such terms as those defined in a generally used dictionary may be interpreted to have the meanings equal or similar to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

In addition, in the disclosure, although the expression "more than" or "less than" is used in order to determine whether or not a particular condition is fulfilled or satisfied, this is only an example and does not exclude the expression "equal to or more than" or "equal to or less than". The expression "equal to or more than" may be replaced with "more than", the expression "equal to or less than" may be replaced with "less than", and the expression "equal to or more than and less than" may be replaced with "more than and equal to or less than" in the conditions above.

A metric for signal gain, signal quality, etc. used in the disclosure may include one of, for example, and without limitation, beam reference signal received power (BRSRP), reference signal received power (RSRP), reference signal received quality (RSRQ), received signal strength indicator (RSSI), signal to interference and noise ratio (SINR), carrier to interference and noise ratio (CINR), error vector magnitude (EVM), bit error rate (BER), and block error rate (BLER). In addition to the described examples, other terms having the same or similar technical meaning as the examples or other indexes indicating signal quality may be also used.

In addition, the disclosure includes terms used in some communication protocols (e.g., new radio (NR) or long term evolution (LTE) defined in $3^{rd}$ generation partnership project (3GPP)) to explain various embodiments, but the terms merely correspond to examples. Various embodiments of the disclosure may also be easily modified and then applied to other communication systems.

The disclosure relates generally to an apparatus and a method for resource allocation in a wireless communication system. For example, in the disclosure, a technology of initiatively/pre-emptively controlling resource allocation by a terminal to prevent and/or reduce the overheating of the terminal will be described.

Figure 1:
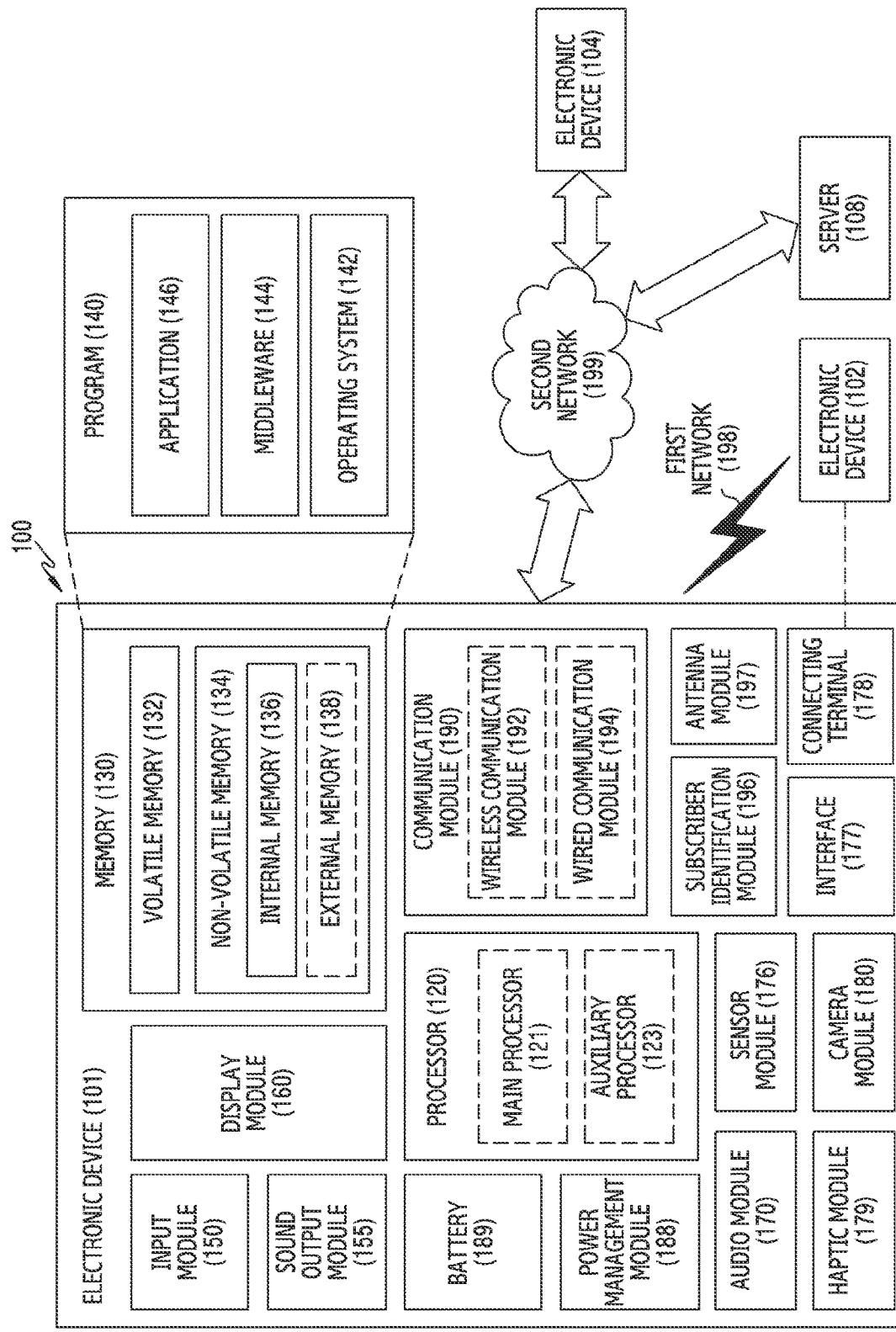
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
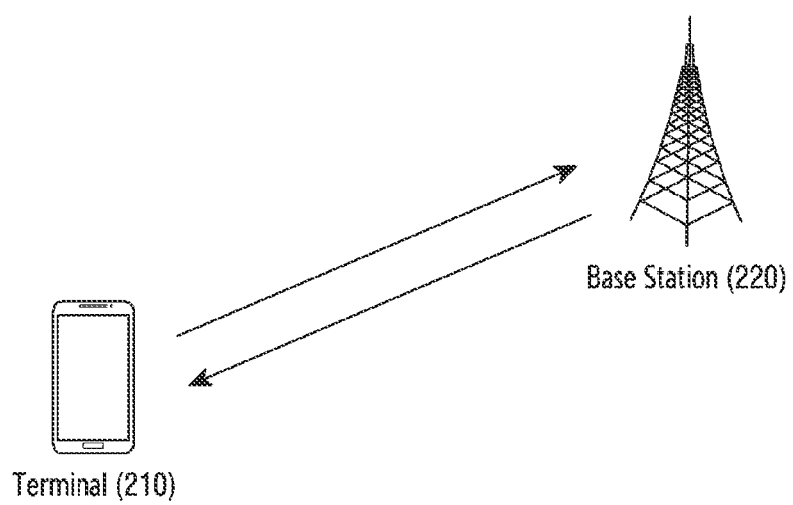
FIG. 2 is a diagram illustrating an example of a wireless communication system according to various embodiments.

FIG. 2 is a diagram illustrating an example of a wireless communication system according to various embodiments.

Referring to FIG. 2, as a part of nodes using wireless channels in a wireless communication system, a terminal 210 and a base station 220 are illustrated. The terminal 210 may also be connected to multiple base stations. Although not illustrated in FIG. 1, the base stations may be connected to the terminal 210 through multiple connectivity (e.g., dual connectivity (DC)).

The terminal 210 may access a data network via the base station 220 and a user plane function (UPF). In order to transmit or receive data via the UPF, the terminal is required to generate a packet data unit (PDU) session, and one PDU session may include one or more quality of service (QoS) flows. The terminal 210 may be referred to as "a user equipment (UE)", "a mobile station", "a subscriber station", "a remote terminal", "a wireless terminal", "a user device", "a customer-premises equipment (CPE)", "an electronic device", or another term having a technical meaning equivalent thereto. The terminal 210 may correspond to the electronic device 101 illustrated in FIG. 1.

The base station 220 is a network infrastructure that provides wireless access to the terminal 210 as a radio access network (RAN) node. The base station 220 has a coverage defined as a predetermined (e.g., specified) geographic area, based on a signal-transmittable distance. The base station 220 may cover one cell or cover multiple cells. The multiple cells may be distinguished based on at least one of an area of a covered sector or a supported frequency. The base station 220 may be referred to, for example, other than "a base station", as "an access point (AP)", "an eNodeB (eNB)", "a 5th generation (5G) node", "a 5G NodeB", "a next generation node B (gNB)", "a wireless point", "a transmission/reception point (TRP)", "a distributed unit (DU)", "a radio unit (RU)", "a remote radio headroom (RRH)", or other terms having a technical meaning equivalent thereto.

At the time of network access, the base station 220 may allocate a maximum resource to the terminal 210. For example, the base station may allocate, to the terminal, a maximum available network resource (e.g., the number of component carriers (CCs), the number of mmWave chip transmit elements, the number of multiple-input multiple-output (MIMO) layers, and a bandwidth in an operating band). Therefore, in order to control power consumption and heating, the terminal 210 uses a scheme of sequentially controlling or interrupting functions required for communication, based on a resulting situation (e.g., overheating, or low voltage of a battery).

However, in this scheme, long term evolution (LTE) fallback control due to heat from the terminal 210 may be applied. In addition, due to the application of LTE fallback control, the terminal may fail to sufficiently secure a $5^{th}$ generation (5G) connection maintenance time. Moreover, since it is impossible to apply LTE fallback control to the terminal in a 5G standalone (SA) situation, there is a problem in that heating control has to be performed in a 5G connection state having high power consumption.

Hereinafter, various example embodiments of the disclosure provide an apparatus and a method for securing a 5G connection maintenance time and controlling heating by being allocated by the terminal 210 for a basic resource required for 5G communication from the base station 220 at the time of network access, and requesting an additional resource, based on data throughput.

Figure 3:
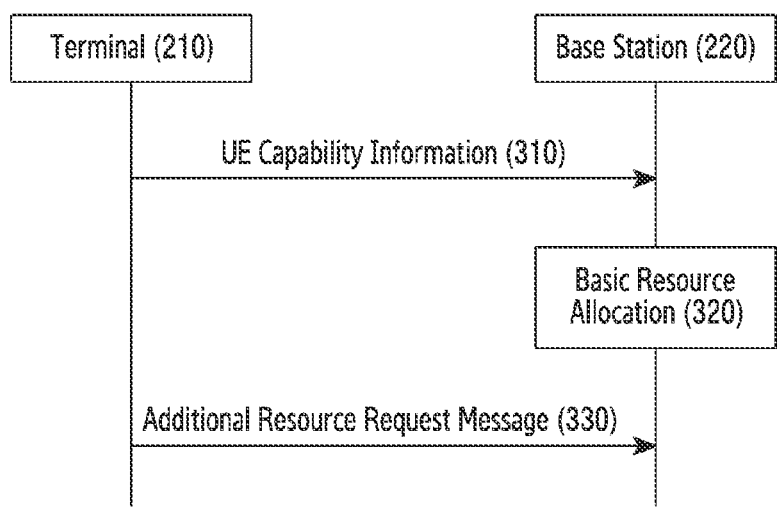
FIG. 3 is a signal flow diagram illustrating an example operation of signaling for resource allocation according to various embodiments.

FIG. 3 is a signal flow diagram illustrating an example operation of signaling for resource allocation according to various embodiments. With reference to FIG. 3, a procedure in which the terminal 210 optimizes power consumption through signaling with the base station 220, and prevents and/or reduces overheating is described.

Referring to FIG. 3, in operation 310, the terminal may transmit user equipment (UE) capability information to the base station 220. The UE capability information may correspond to a request related to a basic resource. The basic resource may be related, for example, and without limitation, to at least one of the number of component carriers (CCs), the number of multiple-input multiple-output (MIMO) layers, or a bandwidth in an operating band. For example, the basic resource may be one CC, single-input single-output (SISO), and a minimum bandwidth (e.g., 100 MHz) in an operating band (e.g., n261). Although not illustrated in FIG. 3, in some embodiments, the base station 220 may transmit a UE capability enquiry message to the terminal 210. The terminal 210 may transmit the UE capability information to the base station 220 in response to the UE capability enquiry message received from the base station 220.

According to an embodiment, the UE capability information may include information indicating a basic resource request. For example, the information indicating the basic resource request may be indicated by one bit.

According to an embodiment, the UE capability information may include information on a basic resource. The information on the basic resource may include at least one of information on the number of CCs, the number of MIMO layers, or a bandwidth in an operating band. For example, the terminal 210 may include, in the capability information, an information element (IE) configured to have "1" as the number of CCs supported thereby, and transmit the information. For example, the terminal 210 may include, in the capability information, an IE configured to have "1" as the number of MIMO layers supported thereby, and transmit the information. For example, the terminal 210 may include, in the capability information, an IE configured to have "100 MHz" as a bandwidth within an operating band, which is supported thereby, and transmit the information.

According to an embodiment, when a basic resource is requested, the UE capability information may not include information on a maximum resource supported by the terminal 210. That is, when a basic resource is requested, so as to reduce the overhead of the UE capability information, the UE capability information may not include information on a maximum resource supported by the terminal 210. The terminal 210 may configure, as a value related to a basic resource requested by the terminal 210, a value corresponding to each information element (IE) of the UE capability information.

In operation 320, the base station 220 may allocate a basic resource to the terminal 210. According to an embodiment, the base station 220 may allocate the basic resource to the terminal 210, based on the received UE capability information. According to an embodiment, the base station 220 may indicate information related to the allocated basic resource to the terminal 210, based, for example, and without limitation, on at least one of a radio resource control (RRC) message, a medium access control control element (MAC CE), and downlink control information (DCI). For example, the allocation of the basic resource to the terminal 210 at the time of network access may reduce or prevent the overheating of the terminal 210.

In operation 330, the terminal 210 may transmit an additional resource request message to the base station 220. According to an embodiment, the terminal 210 may transmit the additional resource request message to the base station 220, based on data throughput. When the data throughput exceeds a threshold value (or it is expected that same exceeds the threshold value), the terminal 210 may transmit the additional resource request message to the base station 220. The threshold value may include one or more values. For example, the terminal 210 may configure one or more stages of transmitting an additional resource request message through one or more values. For example, when the data throughput of the terminal 210 to which the basic resource has been allocated exceeds a first threshold value, the terminal 210 may transmit the additional resource request message to the base station 220. When the data throughput of the terminal 210 to which a resource has been additionally allocated through the additional resource request message exceeds a second threshold value, the terminal may transmit the additional resource request message to the base station 220. The second threshold value is greater than the first threshold value. The threshold value may be called an additional resource request trigger value.

According to an embodiment, the additional resource request message may include information on an additional resource. The information on the additional resource may be identified based on a temperature margin of the terminal 210. The temperature margin may refer, for example, to the difference between the temperature measured through a thermistor inside the terminal 210, and a temperature controlling or interrupting a function of the terminal 210. The information on the additional resource may include at least one of information on the number of CCs, information on a bandwidth, or information on the number of MIMO layers. The information on the additional resource may be configured based on an operation situation (e.g., an application being in use) of the terminal 210. The information on the number of CCs may include at least one of information on the number of downlink CCs, or information on the number of uplink CCs. The information on the bandwidth may include at least one of information on a downlink bandwidth within frequency range (FR) 1, information on an uplink bandwidth within FR1, information on a downlink bandwidth within FR2, or information on an uplink bandwidth within FR2. The information on the number of MIMO layers may include at least one of information on the number of downlink MIMO layers within FR1, information on the number of uplink MIMO layers within FR1, information on the number of downlink MIMO layers within FR2, or information on the number of uplink MIMO layers within FR2. The base station 220 may allocate the additional resource to the terminal 210, based on the information on the additional resource.

According to an embodiment, the additional resource request message may correspond to an overheating assistance message. The information on the additional resource may be indicated to the base station 220 through one or more parameters defined in the overheating assistance message. For example, the one or more parameters related to the additional resource may include at least one of a parameter related to the number of downlink CCs (e.g., reducedCCsDL), a parameter related to the number of uplink CCs (e.g., reducedCCsUL), a parameter related to a downlink bandwidth within frequency range (FR) 1 (e.g., reducedBW-FR1-DL), a parameter related to an uplink bandwidth within FR1 (e.g., reducedBW-FR1-UL), a parameter related to a downlink bandwidth within FR2 (e.g., reducedBW-FR2-DL), a parameter related to an uplink bandwidth within FR2 (e.g., reducedBW-FR2-UL), a parameter related to the number of downlink MIMO layers within FR1 (e.g., reducedMIMO-LayersFR1-DL), a parameter related to the number of uplink MIMO layers within FR1 (e.g., reducedMIMO-LayersFR1-UL), a parameter related to the number of downlink MIMO layers within FR2 (e.g., reducedMIMO-LayersFR2-DL), and a parameter related to the number of uplink MIMO layers within FR2 (e.g., reducedMIMO-LayersFR2-UL).

According to an embodiment, the additional resource request message may correspond to a tracking area update (TAU) request message. TAU may be a procedure of updating a tracking area (TA) to which the terminal 210 belongs, in order to manage the mobility of the terminal 210. The terminal 210 may periodically transmit a TAU request message to the base station 220. When data throughput exceeds a threshold value, the TAU request message may include information requesting update of UE capability information. The information requesting update of the UE capability information may be configured as a UE radio capability information update needed field in the TAU request message. Whether update of the UE capability information is needed may be indicated by one bit. The UE radio capability information update needed field may be configured as shown in Table 1 and Table 2 below.

TABLE 1

| 8 | 7 | 6 | 5 | 4 | 3 | 2 | 1 | |
|---|---|---|---|---|---|---|---|---|
| UE radio capability information update needed IEI | | | | 0 spare | 0 | 0 | URC upd | octet 1 |

TABLE 2

| UE radio capability information update needed flag (URC upd)(octet 1) |
|---|
| Bit |
| 1 |
| 0    UE radio capability information update not needed |
| 1    UE radio capability information update needed |

Although not illustrated in FIG. 3, the base station 220 may transmit a UE capability enquiry message to the terminal 210, based on the received TAU request message. The terminal 210 may transmit UE capability information to the base station 220 in response to the UE capability enquiry message. The transmitted UE capability information may include at least one of information on the number of CCs, information on the number of MIMO layers, information on a bandwidth, information on a band, information on a modulation order, information on a scaling factor, or information on a subcarrier spacing (SCS), which are supported by the terminal 210. The information on the number of CCs may include at least one of information on the number of maximum CCs supported by the terminal 210 in downlink, or information on the number of maximum CCs supported by the terminal 210 in uplink. The information on the number of MIMO layers may include at least one of information on the number of maximum layers supported by the terminal 210 in downlink reception, or information on the number of maximum layers supported by the terminal 210 in uplink transmission. The information on the bandwidth may include information on a channel bandwidth supported by the terminal 210 for an SCS. The information on the band may include information on a frequency band number supported by the terminal 210. The information on the modulation order may include at least one of information on a maximum modulation order supported by the terminal 210 in downlink, or information on a maximum modulation order supported by the terminal 210 in uplink. The information on the scaling factor may include a factor to be applied to a band in calculating a maximum data rate of the terminal 210. The information on the SCS may include at least one of information on an SCS supported by the terminal 210 in downlink, or information on an SCS supported by the terminal 210 in uplink. The base station 220 may allocate an additional resource to the terminal 210, based on the received UE capability information.

In FIG. 3, signaling requesting additional resource allocation from the base station 220 according to data throughput of the terminal 210 after the basic resource is allocated is illustrated. According to embodiments of the disclosure, after a maximum resource is allocated, a basic resource may be allocated to the terminal 210 from the base station 220 through signaling. Hereinafter, an embodiment of being allocated a basic resource from the base station 220 through a user equipment (UE) assistance information message is described in greater detail below with reference to FIG. 4.

Figure 4:
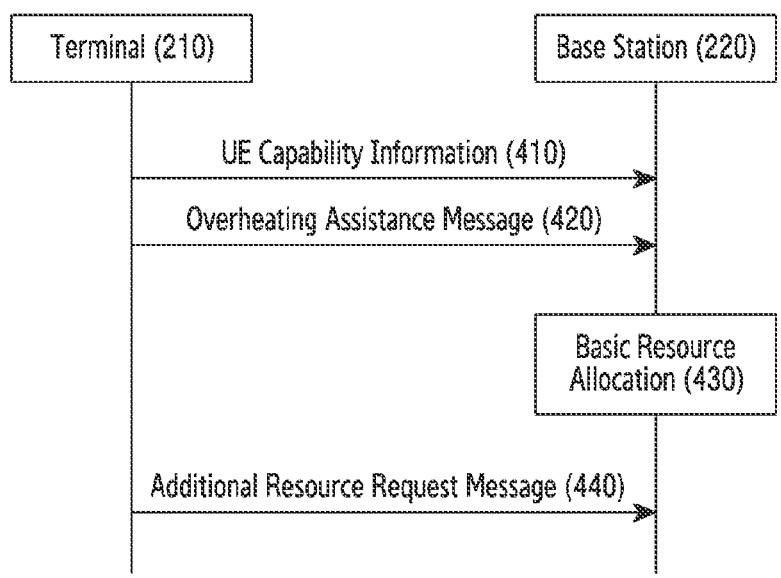
FIG. 4 is a signal flow diagram illustrating an example operation of signaling for resource allocation according to various embodiments.

FIG. 4 is a signal flow diagram illustrating an example operation of signaling for resource allocation according to various embodiments. With reference to FIG. 4, a procedure in which the terminal 210 optimizes power consumption through signaling with the base station 220, and prevents and/or reduces overheating is described.

Referring to FIG. 4, in operation 410, the terminal 210 may transmit user equipment (UE) capability information to the base station 220. The terminal 210 may transmit the UE capability information to the base station 220 in response to a UE capability enquiry message received from the base station 220. According to an embodiment, the UE capability information may include at least one of information on the number of CCs, information on the number of MIMO layers, information on a bandwidth, information on a band, information on a modulation order, information on a scaling factor, or information on a subcarrier spacing (SCS), which are supported by the terminal 210. The information on the number of CCs may include at least one of information on the number of maximum CCs supported by the terminal 210 in downlink, or information on the number of maximum CCs supported by the terminal 210 in uplink. The information on the number of MIMO layers may include at least one of information on the number of maximum layers supported by the terminal 210 in downlink reception, or information on the number of maximum layers supported by the terminal 210 in uplink transmission. The information on the bandwidth may include information on a channel bandwidth supported by the terminal 210 for an SCS. The information on the band may include information on a frequency band number supported by the terminal 210. The information on the modulation order may include at least one of information on a maximum modulation order supported by the terminal 210 in downlink, or information on a maximum modulation order supported by the terminal 210 in uplink. The information on the scaling factor may include a factor to be applied to a band in calculating a maximum data rate of the terminal 210. The information on the SCS may include at least one of information on an SCS supported by the terminal 210 in downlink, or information on an SCS supported by the terminal 210 in uplink. The base station 220 may allocate a resource to the terminal 210, based on the received UE capability information.

In operation 420, the terminal 210 may transmit an overheating assistance message to the base station 220. The overheating assistance message may include one or more parameter related to a basic resource. The one or more parameters related to the basic resource may include at least one of a parameter related to the number of downlink CCs (e.g., reducedCCsDL), a parameter related to the number of uplink CCs (e.g., reducedCCsUL), a parameter related to a downlink bandwidth within frequency range (FR) 1 (e.g., reducedBW-FR1-DL), a parameter related to an uplink bandwidth within FR1 (e.g., reducedBW-FR1-UL), a parameter related to a downlink bandwidth within FR2 (e.g., reducedBW-FR2-DL), a parameter related to an uplink bandwidth within FR2 (e.g., reducedBW-FR2-UL), a parameter related to the number of downlink MIMO layers within FR1 (e.g., reducedMIMO-LayersFR1-DL), a parameter related to the number of uplink MIMO layers within FR1 (e.g., reducedMIMO-LayersFR1-UL), a parameter related to the number of downlink MIMO layers within FR2 (e.g., reducedMIMO-LayersFR2-DL), and a parameter related to the number of uplink MIMO layers within FR2 (e.g., reducedMIMO-LayersFR2-UL). For example, the one or more parameters included in the overheating assistance message may be configured as shown in Table 3 below. According to an embodiment, when internal overheating is detected, the terminal 210 may transmit the overheating assistance message to the base station 220. According to an embodiment, when it is expected that internal overheating will not occur, the terminal 210 may transmit the overheating assistance message to the base station 220. For example, when internal overheating has not occurred for a predetermined period, the terminal 210 may transmit the overheating assistance message to the base station 220. According to an embodiment, the overheating assistance message may be included in a UE assistance information message and then be transmitted.

TABLE 3

| | |
|---|---|
| UEAssistanceInformation-v1540-IEs ::= | SEQUENCE { |
| overheatingAssistance | OverheatingAssistance |
| OPTIONAL, | |
| nonCriticalExtension | UEAssistanceInformation- |
| v16xy-IEs OPTIONAL | |
| } | |
| OverheatingAssistance ::= | SEQUENCE { |
| reducedMaxCCs | SEQUENCE { |
| reducedCCsDL | INTEGER (0..31), |
| reducedCCsUL | INTEGER (0..31) |
| } OPTIONAL, | |
| reducedMaxBW-FR1 | SEQUENCE { |
| reducedBW-FR1-DL | |
| ReducedAggregatedBandwidth, | |
| reducedBW-FR1-UL | |
| ReducedAggregatedBandwidth | |
| } OPTIONAL, | |

TABLE 3-continued

```
reducedMaxBW-FR2                SEQUENCE {
   reducedBW-FR2-DL
ReducedAggregatedBandwidth,
   reducedBW-FR2-UL
ReducedAggregaredBandwidth
} OPTIONAL,
reducedMaxMIMO-LayersFR1        SEQUENCE {
   reducedMIMO-LayersFR1-DL        MIMO-LayersDL,
   reducedMIMO-LayersFR1-UL        MIMO-LayersUL
} OPTIONAL,
reducedMaxMIMO-LayersFR2        SEQUENCE {
   reducedMIMO-LayersFR2-DL        MIMO-LayersDL,
   reducedMIMO-LayersFR2-UL        MIMO-LayersUL
} OPTIONAL
}
```

In operation 430, the base station 220 may allocate a basic resource to the terminal 210. According to an embodiment, the base station 220 may allocate the basic resource to the terminal 210, based on the received overheating assistance message. For example, the terminal 210 may limit the resource allocated through the overheating assistance message to the basic resource. According to an embodiment, the base station 220 may indicate information related to the allocated basic resource to the terminal, based on at least one of a radio resource control (RRC) message, a medium access control control element (MAC CE), and downlink control information (DCI). The allocation of the basic resource to the terminal 210 may reduce or prevent the overheating of the terminal 210. In operation 440, the terminal 210 may transmit an additional resource request message to the base station 220. The operation 440 in FIG. 4 corresponds to the operation 330 in FIG. 3, and thus a detailed description thereof may not be repeated here.

Figure 5:
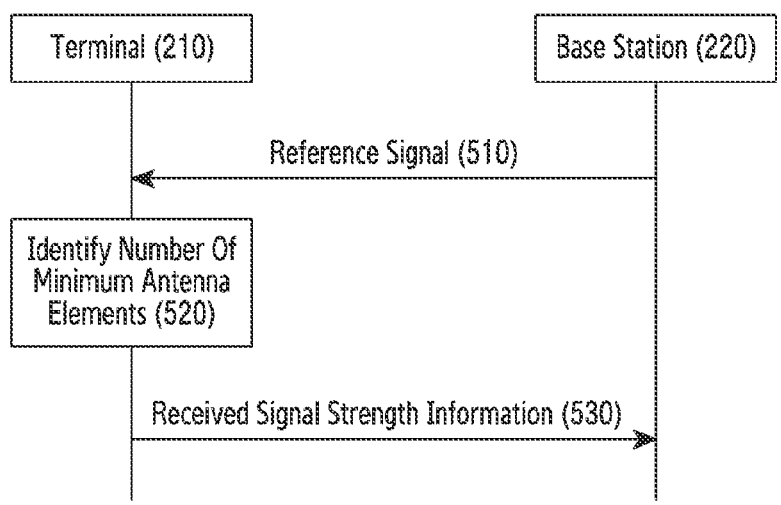
FIG. 5 is a signal flow diagram illustrating an example operation of signaling for identifying the number of antenna elements according to various embodiments.

FIG. 5 is a signal flow diagram illustrating an example operation of signaling for identifying the number of antenna elements of a terminal according to various embodiments. With reference to FIG. 5, a procedure of identifying the number of used antenna elements of an antenna array of the terminal 210 (specifically, a fixed-type device) is described.

Referring to Table 4 below, the number of antenna elements of a 5th generation (5G) patch antenna array is proportional to the power consumption of the terminal 210.

TABLE 4

| The number of Tx antenna elements | TRP (dBm) | 55° C. power (mW) | 85° C. power (mW) |
|---|---|---|---|
| 1 | 0 | 148.7 | 149.7 |
| 4 | 6 | 374.7 | 378.7 |
| 8 | 9 | 701.2 | 709.2 |
| 1 | 14 | 364.7 | 369.7 |
| 4 | 20 | 1239.7 | 1257.7 |
| 8 | 23 | 2432.2 | 2455.2 |

For example, when the terminal 210 is a fixed-type device (e.g., a customer-premises equipment (CPE)), the terminal 210 and the base station 220 has a constant distance therebetween. Therefore, so as to minimize and/or reduce unnecessary power consumption and an increase in device temperature, the number of minimum antenna elements to be used by the terminal 210 for communication is required to be identified. Referring to FIG. 5, in operation 510, the terminal 210 may receive a reference signal from the base station 220. According to an embodiment, the reference signal may include a synchronization signal. The synchronization signal may be a synchronization signal and physical broadcast channel (SS/PBCH) block. According to an embodiment, the reference signal may include a cell specific reference signal (CRS), a channel state information-reference signal (CSI-RS), a channel state information-interference measurement (CSI-IM), or a combination thereof.

In operation 520, the terminal 210 may identify the number of minimum antenna elements. The terminal 210 may identify a received signal strength, based on the received reference signal. The terminal 210 may identify the number of minimum antenna elements, based on the identified received signal strength. The received signal strength may be one of a reference signal receive quality (RSRQ), a reference signal received power (RSRP) or a reference signal strength indicator (RSSI). The number of minimum antenna elements may be the number of antenna elements corresponding to a power for maintaining a signal through beamforming with the base station 220.

In operation 530, the terminal 210 may transmit received signal strength information to the base station 220. The received signal strength information may include at least one of information on an RSRQ, an RSRP, an RSSI, or the number of minimum antenna elements.

According to an embodiment, the operations based on FIG. 5 may be performed before radio resource control (RRC) connection. The terminal 210 or the base station 220 may also perform operations of various embodiments according to the disclosure after performing the operations based on FIG. 5.

Figure 6:
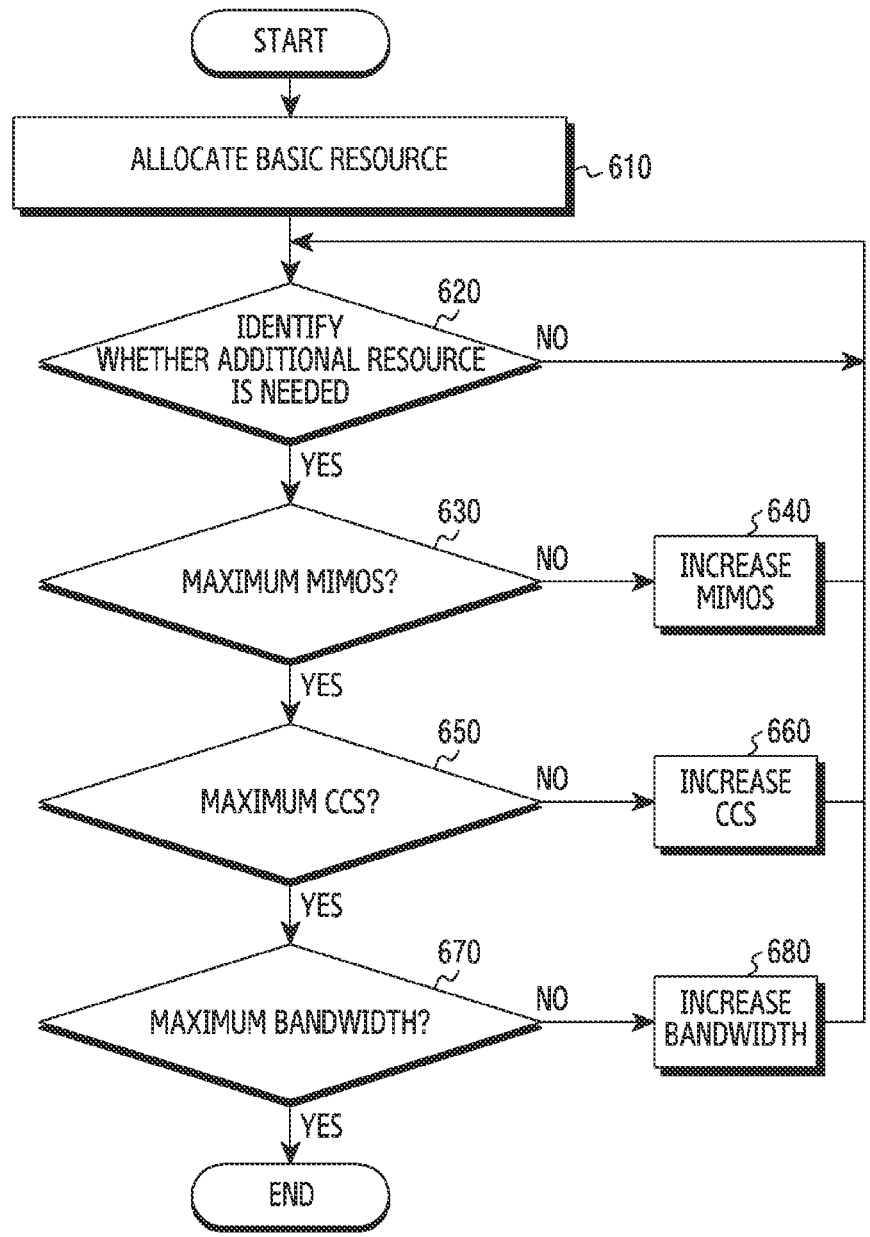
FIG. 6 is a flowchart illustrating an example operation of a terminal for configuring information on an additional resource according to various embodiments.

FIG. 6 is a flowchart illustrating an example operation of a terminal for configuring information on an additional resource according to various embodiments.

Referring to FIG. 6, in operation 610, a basic resource (e.g., a bandwidth of 100 MHz, single-input single-output (SISO), and one component carrier (CC)) may be allocated to the terminal 210 from the bandwidth. According to an embodiment, the terminal 210 may transmit UE capability information corresponding to a basic resource request to the base station 220. The base station 220 may allocate a basic resource to the terminal 210 in response to the reception of the UE capability information corresponding to the basic resource request. According to an embodiment, the terminal 210 may transmit UE capability information corresponding to a maximum resource request to the base station 220. The base station 220 may allocate a maximum resource to the terminal 210 in response to the reception of the UE capability information corresponding to the maximum resource request. The terminal 210 may transmit an overheating assistance message to the base station 220. The base station 220 may allocate a basic resource to the terminal 210, based on basic resource information included in the overheating assistance message.

In operation 620, the terminal 210 may identify whether an additional resource is needed. According to an embodiment, the terminal 210 may identify whether the additional resource is needed, based on data throughput. When the data throughput exceeds a threshold value (or it is expected that same exceeds the threshold value), the terminal 210 may identify that the additional resource is needed. The threshold value may include one or more values. That is, the terminal 210 may configure one or more stages of identifying whether an additional resource is needed, through one or more values. For example, when the data throughput of the terminal 210 exceeds a first threshold value, the terminal 210 may identify that the additional resource is needed. In addition, after the additional resource is allocated, when the data throughput of the terminal 210 exceeds a second threshold value, the terminal 210 may identify that an additional resource is needed. The second threshold value is greater than the first threshold value. The threshold value may be called an additional resource request trigger value.

The terminal 210 may perform operation 630 when it is identified that the additional resource is needed (Yes in operation 620). The terminal 210 may perform operation 620 again when it is not identified that the additional resource is needed (No in operation 620). According to an embodiment, the terminal 210 may monitor an internal temperature for determination in operation 620. For example, the terminal 210 may identify a temperature margin in order to identify whether an overheating assistance message is transmitted.

In operation 630, the terminal 210 may identify whether the number of allocated multiple-input multiple-output (MIMO) layers is maximum. The number of MIMO layers may include at least one of the number of downlink MIMO layers within FR1, the number of uplink MIMO layers within FR1, the number of downlink MIMO layers within FR2, or the number of uplink MIMO layers within FR2.

In operation 640, when the number of MIMO layers is not maximum (No in operation 630), the terminal 210 may increase the number of MIMO layers. Information on the increased number of MIMO layers may be included in information on an additional resource. According to an embodiment, the terminal 210 may transmit the information on the additional resource to the base station 220. After operation 640, the terminal 210 may perform monitoring to identify whether an additional resource is needed again.

In operation 650, when the number of MIMO layers is maximum (Yes in operation 630), the terminal 210 may identify whether the number of allocated component carriers (CCs) is maximum. The number of CCs may include at least one of the number of downlink CCs, or the number of uplink CCs.

In operation 660, when the number of CCs is not maximum (No in operation 650), the terminal 210 may increase the number of CCs. Information on the increased number of CCs may be included in information on an additional resource. According to an embodiment, the terminal 210 may transmit the information on the additional resource to the base station 220. After operation 660, the terminal 210 may perform monitoring to identify whether an additional resource is needed again.

In operation 670, when the number of CCs is maximum (Yes in operation 650), the terminal 210 may identify whether an allocated bandwidth is maximum. The bandwidth may include at least one of a downlink bandwidth within 1, an uplink bandwidth within FR1, a downlink bandwidth within FR2, or an uplink bandwidth within FR2.

In operation 680, when the bandwidth is not maximum (No in operation 670), the terminal 210 may increase the bandwidth. Information on the increased bandwidth may be included in information on an additional resource. According to an embodiment, the terminal 210 may transmit the information on the additional resource to the base station 220. After operation 680, the terminal 210 may perform monitoring to identify whether an additional resource is needed again.

When the bandwidth is maximum, the terminal 210 may terminate the operations based on FIG. 6, and maintain a current state. According to an embodiment, the terminal 210 may perform an operation of preventing and/or reducing overheating through a function control.

In FIG. 6, an additional resource is requested in the order of the number of MIMOs, the number of CCs, and a bandwidth, but this merely corresponds to an example According to an embodiment, when an additional resource is needed, the operations based on FIG. 6 may also be performed while putting a priority on a resource having a small increase in power consumption. Power consumption may vary according to a characteristic of the terminal, and thus a priority may vary according to a characteristic of the terminal. In FIG. 6, an example of increasing one resource among the number of MIMOs, the number of CCs, and a bandwidth is illustrated, but this also merely corresponds to an example. According to an embodiment, the terminal 210 may transmit, to the base station 220, additional resource information in which at least one of the number of MIMOs, the number of CCs, and a bandwidth is increased.

In FIG. 6, an example of requesting an additional resource for all the number of MIMOs, the number of CCs, and a bandwidth is illustrated, but this merely corresponds to an example. According to an embodiment, at least one of the number of MIMOs, the number of CCs, and a bandwidth may be omitted in the requested additional resource.

Figure 7:
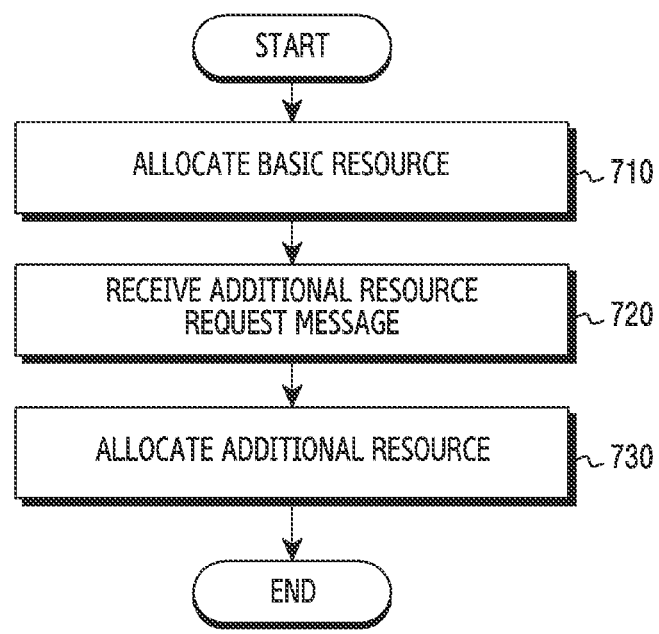
FIG. 7 is a flowchart illustrating an example operation of a base station for resource allocation according to various embodiments.

FIG. 7 is a flowchart illustrating an example operation of a base station for resource allocation according to various embodiments. With reference to FIG. 7, an operation flow of a base station for optimizing power consumption of the terminal 210 and preventing and/or reducing overheating is described.

Referring to FIG. 7, in operation 710, the base station 220 may allocate a basic resource to the terminal 210. According to an embodiment, the base station 220 may indicate information related to the allocated basic resource to the terminal, based on at least one of a radio resource control (RRC) message, a medium access control control element (MAC CE), or downlink control information (DCI).

According to an embodiment, the base station 220 may transmit a user equipment (UE) capability enquiry message to the terminal 210. The base station 220 may receive UE capability information from the terminal 210. The UE capability information may correspond to a request related to a basic resource. The basic resource may be related to at least one of the number of component carriers (CCs), the number of multiple-input multiple-output (MIMO) layers, or a bandwidth in an operating band. For example, the basic resource may be one CC, SISO, and a minimum bandwidth (e.g., 100 MHz) in an operating band (e.g., n261). According to an embodiment, the basic resource may be defined in advance. According to an embodiment, the UE capability information may include information indicating a minimum resource request. For example, the information indicating the minimum resource request may be indicated by one bit. According to an embodiment, the UE capability information may not include information on a maximum resource supported by the terminal 210. The base station 220 may allocate a basic resource to the terminal 210, based on the received UE capability information.

According to an embodiment, the base station 220 may receive UE capability information from the terminal 210. The UE capability information may include at least one of information on the number of CCs, information on the number of MIMO layers, information on a bandwidth, information on a band, information on a modulation order, information on a scaling factor, or information on a subcarrier spacing (SCS), which are supported by the terminal 210. The information on the number of CCs may include at least one of information on the number of maximum CCs supported by the terminal 210 in downlink, or information on the number of maximum CCs supported by the terminal 210 in uplink. The information on the number of MIMO layers may include at least one of information on the number of maximum layers supported by the terminal 210 in downlink reception, or information on the number of maximum layers supported by the terminal 210 in uplink transmission. The information on the bandwidth may include information on a channel bandwidth supported by the terminal 210 for an SCS. The information on the band may include information on a frequency band number supported by the terminal 210. The information on the modulation order may include at least one of information on a maximum modulation order supported by the terminal 210 in downlink, or information on a maximum modulation order supported by the terminal 210 in uplink. The information on the scaling factor may include a factor to be applied to a band in calculating a maximum data rate of the terminal 210. The information on the SCS may include at least one of information on an SCS supported by the terminal 210 in downlink, or information on an SCS supported by the terminal 210 in uplink. The base station 220 may allocate a resource to the terminal 210, based on the received UE capability information. The base station 220 may receive an overheating assistance message from the terminal 210. The overheating assistance message may include one or more parameter related to a basic resource. The one or more parameters related to the basic resource may include at least one of a parameter related to the number of downlink CCs (e.g., reducedCCsDL), a parameter related to the number of uplink CCs (e.g., reducedCCsUL), a parameter related to a downlink bandwidth within frequency range (FR) 1 (e.g., reducedBW-FR1-DL), a parameter related to an uplink bandwidth within FR1 (e.g., reducedBW-FR1-UL), a parameter related to a downlink bandwidth within FR2 (e.g., reducedBW-FR2-DL), a parameter related to an uplink bandwidth within FR2 (e.g., reducedBW-FR2-UL), a parameter related to the number of downlink MIMO layers within FR1 (e.g., reducedMIMO-LayersFR1-DL), a parameter related to the number of uplink MIMO layers within FR1 (e.g., reducedMIMO-LayersFR1-UL), a parameter related to the number of downlink MIMO layers within FR2 (e.g., reducedMIMO-LayersFR2-DL), and a parameter related to the number of uplink MIMO layers within FR2 (e.g., reducedMIMO-LayersFR2-UL). For example, the basic resource may be one CC, SISO, and a minimum bandwidth (e.g., 100 MHz) in an operating band (e.g., n261). The base station 220 may allocate a basic resource to the terminal 210, based on received information on the basic resource.

In operation 720, the base station 220 may receive an additional resource request message from the terminal 210.

According to an embodiment, the additional resource request message may include information on an additional resource. The information on the additional resource may include at least one of information on the number of CCs, information on a bandwidth, or information on the number of MIMO layers. The information on the additional resource may be configured based on an operation situation (e.g., an application being in use) of the terminal 210. The information on the number of CCs may include at least one of information on the number of downlink CCs, or information on the number of uplink CCs. The information on the bandwidth may include at least one of information on a downlink bandwidth within frequency range (FR) 1, information on an uplink bandwidth within FR1, information on a downlink bandwidth within FR2, or information on an uplink bandwidth within FR2. The information on the number of MIMO layers may include at least one of information on the number of downlink MIMO layers within FR1, information on the number of uplink MIMO layers within FR1, information on the number of downlink MIMO layers within FR2, and information on the number of uplink MIMO layers within FR2. According to an embodiment, the additional resource request message may correspond to an overheating assistance message.

According to an embodiment, the additional resource request message may correspond to a tracking area update (TAU) request message. TAU may be a procedure of updating a tracking area (TA) in order to manage the mobility of the terminal 210. The TAU request message may include information requesting update of UE capability information. The information requesting update of the UE capability information may be configured as a UE radio capability information update needed field in the TAU request message. Whether update of the UE capability information is needed may be indicated by one bit. The base station 220 may transmit a UE capability enquiry message to the terminal 210, based on the received TAU request message. The base station 220 may receive UE capability information from the terminal 210. The UE capability information may include at least one of information on the number of CCs, information on the number of MIMO layers, information on a bandwidth, information on a band, information on a modulation order, information on a scaling factor, or information on a subcarrier spacing (SCS), which are supported by the terminal 210. The information on the number of CCs may include at least one of information on the number of maximum CCs supported by the terminal 210 in downlink, or information on the number of maximum CCs supported by the terminal 210 in uplink. The information on the number of MIMO layers may include at least one of information on the number of maximum layers supported by the terminal 210 in downlink reception, or information on the number of maximum layers supported by the terminal 210 in uplink transmission. The information on the bandwidth may include information on a channel bandwidth supported by the terminal 210 for an SCS. The information on the band may include information on a frequency band number supported by the terminal 210. The information on the modulation order may include at least one of information on a maximum modulation order supported by the terminal 210 in downlink, or information on a maximum modulation order supported by the terminal 210 in uplink. The information on the scaling factor may include a factor to be applied to a band in calculating a maximum data rate of the terminal 210. The information on the SCS may include at least one of information on an SCS supported by the terminal 210 in downlink, or information on an SCS supported by the terminal 210 in uplink.

In operation 730, the base station 220 may allocate an additional resource to the terminal 210. According to an embodiment, the base station 220 may allocate the additional resource to the terminal 210, based on the received additional resource request message. According to an embodiment, the base station 220 may allocate the additional resource to the terminal 210, based on the received UE capability information. According to an embodiment, the base station 220 may allocate the additional resource to the terminal 210, based on the received overheating assistance message.

Figure 8:
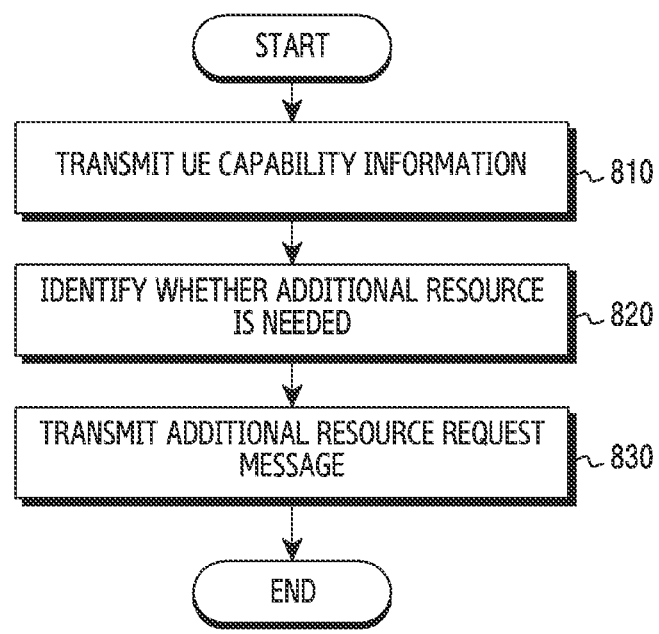
FIG. 8 is a flowchart illustrating an example operation of a terminal for resource allocation according to various embodiments.

FIG. 8 is a flowchart illustrating an example operation of a terminal for resource allocation according to various embodiments. With reference to FIG. 8, an operation flow of the terminal 210 for optimizing power consumption and preventing and/or reducing overheating is described.

In operation 810, the terminal 210 may transmit UE capability information to the base station 220.

According to an embodiment, the UE capability information may correspond to a request related to a basic resource. The basic resource may be related to at least one of the number of component carriers (CC), the number of multiple-input multiple-output (MIMO) layers, or a bandwidth in an operating band. For example, the basic resource may be one CC, SISO, and a minimum bandwidth (e.g., 100 MHz) in an operating band (e.g., n261). According to an embodiment, the UE capability information may include information indicating a minimum resource request. For example, the information indicating the minimum resource request may be indicated by one bit. According to an embodiment, when the UE capability information corresponds to a request related to a basic resource, the UE capability information may not include information on a maximum resource supported by the terminal 210. The base station 220 may allocate a basic resource to the terminal 210, based on the received UE capability information.

According to an embodiment, the UE capability information may include at least one of information on the number of CCs, information on the number of MIMO layers, information on a bandwidth, information on a band, information on a modulation order, information on a scaling factor, or information on a subcarrier spacing (SCS), which are supported by the terminal 210. The information on the number of CCs may include at least one of information on the number of maximum CCs supported by the terminal 210 in downlink, or information on the number of maximum CCs supported by the terminal 210 in uplink. The information on the number of MIMO layers may include at least one of information on the number of maximum layers supported by the terminal 210 in downlink reception, or information on the number of maximum layers supported by the terminal 210 in uplink transmission. The information on the bandwidth may include information on a channel bandwidth supported by the terminal 210 for an SCS. The information on the band may include information on a frequency band number supported by the terminal 210. The information on the modulation order may include at least one of information on a maximum modulation order supported by the terminal 210 in downlink, or information on a maximum modulation order supported by the terminal 210 in uplink. The information on the scaling factor may include a factor to be applied to a band in calculating a maximum data rate of the terminal 210. The information on the SCS may include at least one of information on an SCS supported by the terminal 210 in downlink, or information on an SCS supported by the terminal 210 in uplink. The base station 220 may allocate a resource to the terminal 210, based on the received UE capability information. The terminal 210 may transmit an overheating assistance message to the base station 220. The overheating assistance message may include information on a basic resource. The overheating assistance message may include one or more parameter related to the basic resource. The one or more parameters related to the basic resource may include at least one of a parameter related to the number of downlink CCs (e.g., reducedCCsDL), a parameter related to the number of uplink CCs (e.g., reducedCCsUL), a parameter related to a downlink bandwidth within frequency range (FR) 1 (e.g., reducedBW-FR1-DL), a parameter related to an uplink bandwidth within FR1 (e.g., reducedBW-FR1-UL), a parameter related to a downlink bandwidth within FR2 (e.g., reducedBW-FR2-DL), a parameter related to an uplink bandwidth within FR2 (e.g., reducedBW-FR2-UL), a parameter related to the number of downlink MIMO layers within FR1 (e.g., reducedMIMO-LayersFR1-DL), a parameter related to the number of uplink MIMO layers within FR1 (e.g., reducedMIMO-LayersFR1-UL), a parameter related to the number of downlink MIMO layers within FR2 (e.g., reducedMIMO-LayersFR2-DL), and a parameter related to the number of uplink MIMO layers within FR2 (e.g., reducedMIMO-LayersFR2-UL). The basic resource may be related to at least one of the number of CCs, the number of MIMO layers, or a bandwidth in an operating band. The base station 220 may allocate the basic resource to the terminal 210, based on the received overheating assistance message.

In operation 820, the terminal 210 may identify whether an additional resource is needed. According to an embodiment, the terminal 210 may identify whether the additional resource is needed, based on data throughput. When the data throughput exceeds a threshold value (or it is expected that same exceeds the threshold value), the terminal 210 may identify that the additional resource is needed. The threshold value may include one or more values. That is, the terminal 210 may configure one or more stages enabling identifying of whether an additional resource is needed, through one or more values. For example, when the data throughput of the terminal 210 to which the basic resource has been allocated exceeds a first threshold value, the terminal 210 may identify that the additional resource is needed. In addition, after the additional resource is allocated, when the data throughput of the terminal 210 exceeds a second threshold value, the terminal 210 may identify that an additional resource is needed. The second threshold value is greater than the first threshold value. The threshold value may be called an additional resource request trigger value.

In operation 830, the terminal 210 may transmit an additional resource request message to the base station 220. When it is identified that the additional resource is needed, the terminal 210 may transmit an additional resource request message to the base station 220.

According to an embodiment, an additional resource allocation request message may include information on an additional resource. The information on the additional resource may be identified based on a temperature margin of the terminal 210. The temperature margin may be the difference between the temperature measured through a thermistor inside the terminal 210, and a temperature controlling or interrupting a function of the terminal 210. The information on the additional resource may include at least one of information on the number of CCs, information on a bandwidth, or information on the number of MIMO layers. The information on the number of CCs may include at least one of information on the number of downlink CCs, or information on the number of uplink CCs. The information on the bandwidth may include at least one of information on a downlink bandwidth within frequency range (FR) 1, information on an uplink bandwidth within FR1, information on a downlink bandwidth within FR2, or information on an uplink bandwidth within FR2. The information on the number of MIMO layers may include at least one of information on the number of downlink MIMO layers within FR1, information on the number of uplink MIMO layers within FR1, information on the number of downlink MIMO layers within FR2, or information on the number of uplink MIMO layers within FR2. The base station 220 may allocate an additional resource to the terminal 210, based on the information on the additional resource. According to an embodiment, the additional resource request message may be called an overheating assistance message.

According to an embodiment, the additional resource request message may correspond to a tracking area update (TAU) request message. TAU may be a procedure of updating a tracking area (TA) to which the terminal 210 belongs, in order to manage the mobility of the terminal 210. The terminal 210 may periodically transmit a TAU request message to the base station 220. When data throughput exceeds a threshold value, the TAU request message may include information requesting update of UE capability information. The information requesting update of the UE capability information may be configured as a UE radio capability information update needed field in the TAU request message. Whether update of the UE capability information is needed may be indicated by one bit. The base station 220 may transmit a UE capability enquiry message to the terminal 210, based on the received TAU request message. The terminal 210 may transmit UE capability information to the base station 220 in response to the UE capability enquiry message. The UE capability information may include at least one of information on the number of CCs, information on the number of MIMO layers, information on a bandwidth, information on a band, information on a modulation order, information on a scaling factor, or information on a subcarrier spacing (SCS), which are supported by the terminal 210. The information on the number of CCs may include at least one of information on the number of maximum CCs supported by the terminal 210 in downlink, or information on the number of maximum CCs supported by the terminal 210 in uplink. The information on the number of MIMO layers may include at least one of information on the number of maximum layers supported by the terminal 210 in downlink reception, or information on the number of maximum layers supported by the terminal 210 in uplink transmission. The information on the bandwidth may include information on a channel bandwidth supported by the terminal 210 for an SCS. The information on the band may include information on a frequency band number supported by the terminal 210. The information on the modulation order may include at least one of information on a maximum modulation order supported by the terminal 210 in downlink, or information on a maximum modulation order supported by the terminal 210 in uplink. The information on the scaling factor may include a factor to be applied to a band in calculating a maximum data rate of the terminal 210. The information on the SCS may include at least one of information on an SCS supported by the terminal 210 in downlink, or information on an SCS supported by the terminal 210 in uplink. The base station 220 may allocate an additional resource to the terminal 210, based on the received UE capability information.

Through FIGS. 1, 2, 3, 4, 5, 6, 7 and FIG. 8, initiatively/pre-emptively controlling resource allocation by a terminal has been described. In a conventional 5th generation (5G) communication system, when a terminal accesses a network, a maximum resource is allocated to the terminal, and thus power may be excessively consumed, and long term evolution (LTE) due to overheating may occur. However, a general scenario (e.g., Internet browsing, a three-dimensional (3D) game, or watching high-quality video) does not require a high data throughput, and thus 5G communication may be possible only with basic resource allocation. For example, referring to Table 5 and Table 6 below, while a recommended bit rate for a high dynamic range (HDR) upload is only a maximum of 85 Mbps, data throughput based on a basic resource runs to 323.2 Mbps.

TABLE 5

Recommended bit rate for standard dynamic range (SDR) upload

| Type | Standard frame rate (SFR), Mbps | High frame rate, (HFR) Mbps | Type | Recommended bit rate for high dynamic range (HDR) upload | |
| --- | --- | --- | --- | --- | --- |
| | | | | SFR, Mbps | HFR, Mbps |
| 2160p (4k) | 35-45 | 53-68 | 2160p (4k) | 44-56 | 66-85 |
| 1440p (2k) | 16 | 24 | 1440p (2k) | 20 | 30 |
| 1080p | 8 | 12 | 1080p | 10 | 15 |
| 720p | 5 | 7.5 | 720p | 6.5 | 9.5 |
| 480p | 2.5 | 4 | 480p | Not supported | Not supported |
| 360p | 1 | 1.5 | 360p | Not supported | Not supported |

TABLE 6

FR2 throughput

| | |
| --- | --- |
| Bandwidth | 100 MHz |
| Subcarrier spacing (SCS) | 120 kHz |
| Modulation | 64 QAM |
| Multiple-input multiple-output (MIMO) | Single-input single-output (SISO) |
| Component carrier (CC) | 1 |
| DL:UL Ratio (4:1) | 0.8 |
| Resource block (RB) | 66 |
| Subcarrier | 12 |
| Orthogonal frequency division multiplexing (OFDM) symbol | 56 |
| Data bit | 6 |
| Layer (component carrier (CC) or MIMO) | 1 |
| Code rate | 0.92578125 |
| Overhead | 0.18 |
| TP, bps | 404,032,860 |
| TP, Mbps | 404.0 |
| Downlink TP, Mbps | 323.2 |

Therefore, according to various embodiments of the disclosure, only a basic network resource may be allocated to a terminal to perform 5G communication, and a network resource may be additionally allocated thereto by a determination and request of the terminal itself, and thus optimization of power consumption and overheating prevention and/or reduction may be possible.

An electronic device according to an example embodiment of the disclosure may include: a communication circuit and at least one processor operatively connected to the communication circuit, wherein the at least one processor is configured to: control the communication circuit to transmit first capability information of the electronic device to a base station; identify, based on data throughput, whether an additional resource is needed; and based on identifying that the additional resource is needed, control the communication circuit to transmit an additional resource request message to the base station, the first capability information corresponding to a request related to a basic resource, and the basic resource being related to at least one of the number of component carriers (CCs), the number of multiple-input multiple-output (MIMO) layers, or a bandwidth in an operating band.

According to an example embodiment, the additional resource request message may include at least one of information on the number of downlink CCs, information on the number of uplink CCs, information on the number of downlink MIMO layers, information on the number of uplink MIMO layers, information on a downlink bandwidth, or information on an uplink bandwidth.

According to an example embodiment, the at least one processor may be configured to: control the communication circuit to receive a user equipment (UE) capability enquiry message from the base station, and transmit second capability information of the electronic device to the base station, the additional resource request message may correspond to a tracking area update (TAU) request message, and the TAU request message may include a request to update the first capability information.

According to an example embodiment, the at least one processor may be configured to: control the communication circuit to receive a reference signal from the base station; and identify, based on a received strength of the reference signal, a minimum number of antenna elements.

According to an example embodiment, the at least one processor may be configured to: based on the data throughput exceeding a threshold value, control the communication circuit to transmit the additional resource request message to the base station; and identify, based on an internal temperature margin of the electronic device, information included in the additional resource request message, wherein the internal temperature margin may correspond to a difference between a measured temperature value of the electronic device and a value specified for a function control of the electronic device.

According to an example embodiment, the electronic device may correspond to a customer-premises equipment (CPE).

An electronic device according to an example embodiment of the disclosure may include: a communication circuit and at least one processor operatively connected to the communication circuit, wherein the at least one processor is configured to: control the communication circuit to transmit first capability information of the electronic device to a base station and transmit an overheating assistance message to the base station; identify, based on data throughput, whether an additional resource is needed; and based on identifying that the additional resource is needed, control the communication circuit to transmit an additional resource request message to the base station, the overheating assistance message including information on a basic resource, and the information on the basic resource including at least one of information on the number of component carriers (CCs), the number of multiple-input multiple-output (MIMO) layers, or a bandwidth.

According to an example embodiment, the additional resource request message may include at least one of information on the number of downlink CCs, information on the number of uplink CCs, information on the number of downlink MIMO layers, information on the number of uplink MIMO layers, information on a downlink bandwidth, or information on an uplink bandwidth.

According to an example embodiment, the at least one processor may be configured to: control the communication circuit to receive a user equipment (UE) capability enquiry message from the base station, and transmit second capability information of the electronic device to the base station, the additional resource request message may correspond to a tracking area update (TAU) request message, and the TAU request message may include a request to update the first capability information.

According to an example embodiment, the at least one processor may be configured to: control the communication circuit to receive a reference signal from the base station; and identify, based on a received strength of the reference signal, a minimum number of antenna elements.

According to an example embodiment, the at least one processor may be configured to: based on the data throughput exceeding a threshold value, control the communication circuit to transmit the additional resource request message to the base station; and identify, based on an internal temperature margin of the electronic device, information included in the additional resource request message, wherein the internal temperature margin may correspond to a difference between a measured temperature value of the electronic device and a value specified for a function control of the electronic device.

According to an example embodiment, the electronic device may correspond to a customer-premises equipment (CPE).

A method performed by an electronic device according to an example embodiment of the disclosure may include: transmitting first capability information of the electronic device to a base station, identifying, based on data throughput, whether an additional resource is needed, and based on identifying that the additional resource is needed, transmitting an additional resource request message to the base station, wherein the first capability information corresponds to a request related to a basic resource, and the basic resource is related to at least one of the number of component carriers (CCs), the number of multiple-input multiple-output (MIMO) layers, or a bandwidth in an operating band.

According to an example embodiment, the additional resource request message may include at least one of information on the number of downlink CCs, information on the number of uplink CCs, information on the number of downlink MIMO layers, information on the number of uplink MIMO layers, information on a downlink bandwidth, or information on an uplink bandwidth.

According to an example embodiment, the method may include: receiving a user equipment (UE) capability enquiry message from the base station, and transmitting second capability information of the electronic device to the base station, wherein the additional resource request message corresponds to a tracking area update (TAU) request message, and the TAU request message includes a request to update the first capability information.

According to an example embodiment, the method may include receiving a reference signal from the base station, and identifying, based on a received strength of the reference signal, a minimum number of antenna elements.

According to an example embodiment, the method may include: identifying, based on an internal temperature margin of the electronic device, information included in the additional resource request message, wherein the additional resource request message is transmitted based on the data throughput exceeding a threshold value, wherein the internal temperature margin corresponds to a difference between a measured temperature value of the electronic device and a value specified for a function control of the electronic device.

According to an example embodiment, the electronic device may correspond to a customer-premises equipment (CPE).

A method performed by an electronic device according to an example embodiment of the disclosure may include: transmitting first capability information of the electronic device to a base station, transmitting an overheating assistance message to the base station, identifying, based on data throughput, whether an additional resource is needed, and based on identifying that the additional resource is needed, transmitting an additional resource request message to the base station, wherein the overheating assistance message includes information on a basic resource, and the information on the basic resource includes at least one of information on the number of component carriers (CCs), the number of multiple-input multiple-output (MIMO) layers, or a bandwidth.

According to an example embodiment, the additional resource request message may include at least one of information on the number of downlink CCs, information on the number of uplink CCs, information on the number of downlink MIMO layers, information on the number of uplink MIMO layers, information on a downlink bandwidth, or information on an uplink bandwidth.

According to an example embodiment, the method may include receiving a user equipment (UE) capability enquiry message from the base station, and transmitting second capability information of the electronic device to the base station, wherein the additional resource request message corresponds to a tracking area update (TAU) request message, and the TAU request message includes a request to update the first capability information.

According to an example embodiment, the method may include receiving a reference signal from the base station, and identifying, based on a received strength of the reference signal, the number of minimum antenna elements.

According to an example embodiment, the method may include identifying, based on an internal temperature margin of the electronic device, information included in the additional resource request message, wherein the additional resource request message is transmitted based on the data throughput exceeding a threshold value, and the internal temperature margin corresponds to a difference between a measured temperature value of the electronic device and a value specified for a function control of the electronic device.

According to an example embodiment, the electronic device may correspond to a customer-premises equipment (CPE).

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various modification may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device in a wireless communication system, the electronic device comprising:
   a communication circuit;
   at least one processor, comprising processing circuitry, electrically connected to the communication circuit; and
   memory storing instructions that, when executed by the at least one processor individually or collectively, cause the electronic device to:
      transmit, to a base station, first capability information of the electronic device using the communication circuit, wherein the first capability information includes first information for requesting first resources to be assigned for controlling an internal temperature of the electronic device,
      receive, from the base station, information indicating that the first resources for controlling the internal temperature are assigned to the electronic device,
      in case that data throughput is greater than a threshold configured for triggering a request of additional resources, identify that second resources corresponding to the additional resources are needed for an additional data transmission, and
      based on identifying that the second resources are needed, transmit, to the base station, a tracking area update (TAU) message for requesting the second resources, wherein the TAU message includes second information indicating that update of the first capability information is needed for requesting the second resources,
   wherein the first resources correspond to minimum and/or low resources for a communication between the electronic device and the base station,
   wherein the first information includes at least one of a number of component carriers (CCs) for controlling the internal temperature, a number of multiple-input multiple-output (MIMO) layers for controlling the internal temperature, or a bandwidth for controlling the internal temperature, and
   wherein the second information includes at least one of a maximum and/or large number of CCs supported by the electronic device, a maximum and/or large number of MIMO layers supported by the electronic device, or a maximum bandwidth supported by the electronic device.

2. The electronic device of claim 1, wherein the instructions, when executed by the at least one processor individually or collectively, cause the electronic device to:
   receive, from the base station, a reference signal using the communication circuit, and
   identify, based on a strength of the received reference signal, a minimum number of antenna elements.

3. The electronic device of claim 1, wherein information on an internal temperature margin of the electronic device is included in the TAU message for requesting the second resources, and
   wherein the internal temperature margin corresponds to a difference between a measured temperature value of the electronic device and a value specified for a function control of the electronic device.

4. The electronic device of claim 2, wherein the electronic device comprises a customer-premises equipment (CPE).

5. An electronic device in a wireless communication system, the electronic device comprising:
   a communication circuit; and
   at least one processor, comprising processing circuitry, electrically connected to the communication circuit, and configured to:
      transmit, to a base station, first capability information of the electronic device using the communication circuit, wherein the first capability information includes first information for requesting first resources to be assigned for controlling an internal temperature of the electronic device,
      receive, from the base station, information indicating that the first resources for controlling the internal temperature are assigned to the electronic device,
      in case that data throughput is greater than a threshold configured for triggering a request of additional resources, identify that second resources corresponding to the additional resources are needed for an additional data transmission, and
      based on identifying that the second resources are needed, transmit, to the base station, a tracking area update (TAU) message for requesting the second resources, wherein the TAU message includes second information indicating that update of the first capability information is needed for requesting the second resources,
   wherein the first resources correspond to minimum resources for a communication between the electronic device and the base station,
   wherein the first information includes at least one of a number of component carriers (CCs) for controlling the internal temperature, a number of multiple-input multiple-output (MIMO) layers for controlling the internal temperature, or a bandwidth for controlling the internal temperature, and
   wherein the second information includes at least one of a maximum number of CCs supported by the electronic device, a maximum number of MIMO layers supported by the electronic device, or a maximum bandwidth supported by the electronic device.

6. The electronic device of claim 5, wherein the at least one processor is configured to:
  receive, from the base station, a reference signal using the communication circuit, and
  identify, based on a strength of the received reference signal, a minimum number of antenna elements.

7. The electronic device of claim 5, wherein information on an internal temperature margin of the electronic device is included in the TAU message for requesting the second resources, and
  wherein the internal temperature margin corresponds to a difference between a measured temperature value of the electronic device and a value specified for a function control of the electronic device.

8. The electronic device of claim 6, wherein the electronic device comprises a customer-premises equipment (CPE).

9. A method performed by an electronic device in a wireless communication system, the method comprising:
  transmitting, to a base station, first capability information of the electronic device using a communication circuit, wherein the first capability information includes first information for requesting first resources to be assigned for controlling an internal temperature of the electronic device;
  receiving, from the base station, information indicating that the first resources for controlling the internal temperature are assigned to the electronic device;
  in case that data throughput is greater than a threshold configured for triggering a request of additional resources, identifying that second resources corresponding to the additional resources are needed for an additional data transmission; and
  based on identifying that the second resources are needed, transmitting, to the base station, a tracking area update (TAU) message for requesting the second resources, wherein the TAU message includes second information indicating that update of the first capability information is needed for requesting the second resources,
  wherein the first resources correspond to minimum resources for a communication between the electronic device and the base station,
  wherein the first information includes at least one of a number of component carriers (CCs) for controlling the internal temperature, a number of multiple-input multiple-output (MIMO) layers for controlling the internal temperature, or a bandwidth for controlling the internal temperature, and
  wherein the second information includes at least one of a maximum number of CCs supported by the electronic device, a maximum number of MIMO layers supported by the electronic device, or a maximum bandwidth supported by the electronic device.

10. The method of claim 9, further comprising:
  receiving, from the base station, a reference signal; and
  identifying, based on a strength of the received reference signal, a minimum number of antenna elements.

11. The method of claim 9, wherein information on an internal temperature margin of the electronic device is included in the TAU message for requesting the second resources, and
  wherein the internal temperature margin corresponds to a difference between a measured temperature value of the electronic device and a value specified for a function control of the electronic device.

12. The method of claim 10, wherein the electronic device comprises a customer-premises equipment (CPE).

* * * * *